United States Patent Office.

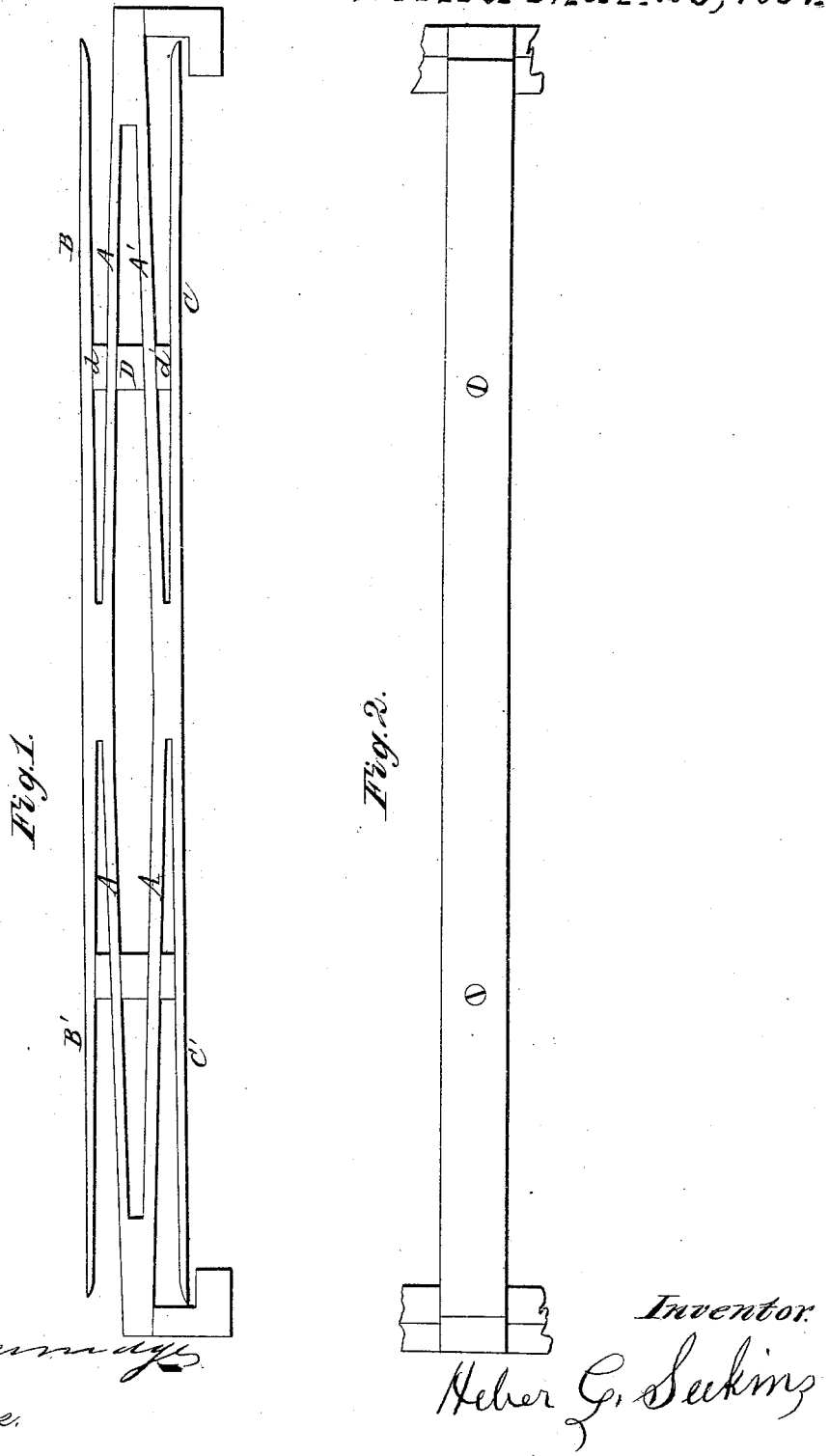

HEBER G. SEEKINS, OF ELYRIA, OHIO, ASSIGNOR TO HIMSELF, LEONARD B. GRIFFING, AND ORANGE S. FRARY, OF THE SAME PLACE.

*Letters Patent No. 63,313, dated March 26, 1867.*

IMPROVED BED-BOTTOM SPRING.

*The Schedule referred to in these Letters Patent and making part of the same.*

TO ALL WHOM IT MAY CONCERN:

Be it known that I, HEBER G. SEEKINS, of Elyria, in the county of Lorain, and State of Ohio, have invented a new and improved Compound Bed-Spring for Bed Bottoms; and I do hereby declare that the following is a full and exact description thereof, reference being had to the accompanying drawing and the letters of reference marked thereon.

The nature of my invention consists in so constructing a compound bed-spring for bed bottoms that when it is compressed in the middle, as hereinafter described, the ends of the upper leaves B B', and of the under leaves C C', will recede from a central horizontal line, and thereby adapt it to the natural position of the body of the occupant. The spring is so constructed that all of its parts act in such combination that by compression in the middle, as described, the extreme ends of the lower leaves C C' will bear on the supports attached to the bedstead, at its head and foot, before the centres of the spring, where the pressure is applied, come in contact with each other, thereby producing a double-spring effect or acting as a double spring on the upper and under sides of the same, and well adapting the spring to secure the result for which it is designed.

To enable others skilled in the art to make and use my invention, I will proceed to describe its construction and operation; and first as to its construction.

I take a piece of timber of suitable length for a bed, some two inches in width, and of proper thickness, and when on its edge saw it through its centre the whole length, except about six inches at each end of the same. Then commence at each end, on both sides, or a distance therefrom in proportion to the thickness of the leaves desired, and saw towards the centre to within three inches of the same, considering the length, thereby making the upper leaves B B' and the under leaves C C', and so that all the said leaves shall be of suitable thickness. And I then insert fulcrum-blocks $d\ d'$ between the said leaves, on each side of the centre, at suitable distances therefrom, towards each end of the spring, thereby slightly separating the said leaves and giving the leaves A A and A' A' a slightly curved appearance. I have the attachments on the bedstead at each end thereof, on which the spring-rests extend under the ends of the lower leaves C C' a short distance so as to receive the bearing of the ends of the lower leaves C C' when the spring is compressed at or near the centre, between the fulcrum-blocks $d\ d'$.

Having thus described the construction of my compound bed-spring, I will now proceed to describe its operation and the advantages gained by its use.

When in position for use said spring rests at each end on suitable attachments fastened to the bedstead at the head and foot thereof. When weight or pressure is applied at or near the centre of the spring, the opposite surfaces, between the fulcrum-blocks $d\ d'$, approach each other, and the ends of the leaves B B' and C C' are separated from a horizontal line, the pressure over the said fulcrum-blocks having a tendency to depress the lower leaves C C', and thus lower said fulcra, while their ends remain stationary, and before said inside surfaces come in contact with each other the ends of the lower leaves C C' strike the attachments upon the bedstead, as above mentioned, and thereby produce the effect of a second or double spring, in addition to that obtained without the striking of the ends of said leaves C C' upon such attachments, so extended as aforesaid. When the pressure is applied to the spring in position, as aforesaid, the ends of the upper leaves B B' will be elevated, which will give great ease and comfort to the person lying thereon by naturally elevating both ends of the bed and adapting it to the body.

The advantages of this spring are its cheapness, its easiness of manufacture, its durability, the noiselessness of its operation, and its perfect adaptability to the most easy, comfortable, and natural position of the body of the occupant. And if for any reason it is desired to change ends with it or turn it over, it will work just as well as before. This spring possesses all the desirable qualities of the most complicated and expensive devices now being manufactured for the purpose for which it is designed.

In the drawings, Figure 1 is a side view.

In the drawings, Figure 2 is a plane view.

What I claim as my invention or improvement, and wish to secure by Letters Patent, is—

A compound bed-spring consisting of the middle leaves A A', the upper leaves B B', and lower leaves C C', the several springs being supported by the fulcrum-blocks $d\ d'$, constructed and arranged as and for the purpose specified.

HEBER G. SEEKINS.

Witnesses:
L. BRECKENRIDGE,
CHARLES DOWNING.